June 12, 1951 — A. GROELLER — 2,556,270

TRACTION ATTACHMENT DEVICE FOR VEHICLE WHEELS

Filed March 18, 1950 — 3 Sheets-Sheet 1

INVENTOR.
ALEXANDER GROELLER
BY Hudson, Boughton,
Williams, David & Hoffmann
ATTORNEYS June 12, 1951 A. GROELLER 2,556,270
TRACTION ATTACHMENT DEVICE FOR VEHICLE WHEELS
Filed March 18, 1950 3 Sheets-Sheet 2

INVENTOR.
ALEXANDER GROELLER
BY Hudson, Boughton,
Williams, David & Hoffmann.
ATTORNEYS June 12, 1951           A. GROELLER           2,556,270
TRACTION ATTACHMENT DEVICE FOR VEHICLE WHEELS
Filed March 18, 1950           3 Sheets-Sheet 3
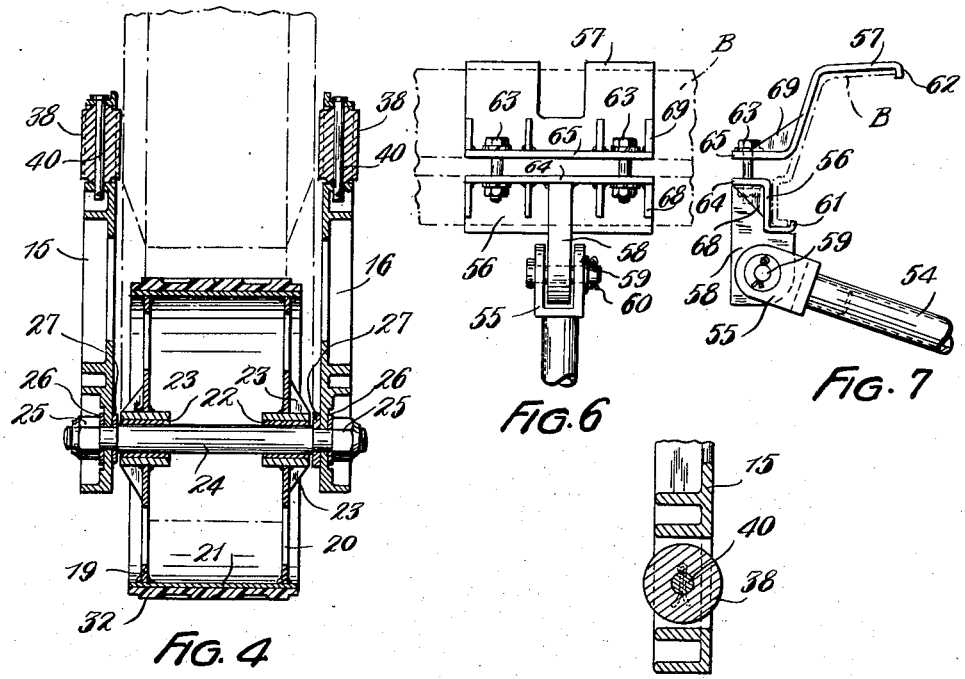
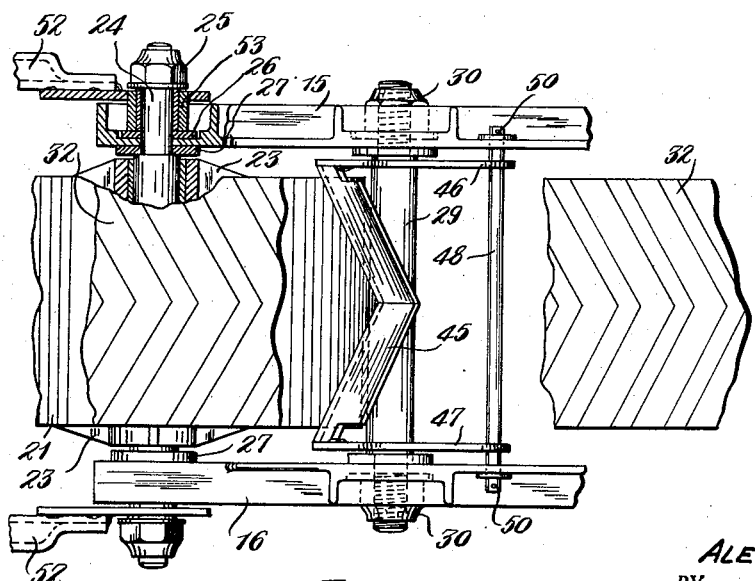
INVENTOR.
ALEXANDER GROELLER
BY Hudson, Broughton,
Williams, David & Hoffmann.
ATTORNEYS Patented June 12, 1951

2,556,270

UNITED STATES PATENT OFFICE 2,556,270

TRACTION ATTACHMENT DEVICE FOR VEHICLE WHEELS

Alexander Groeller, Northville, Mich.

Application March 18, 1950, Serial No. 150,445

6 Claims. (Cl. 305—3)

The present invention relates to a traction attachment device which can be readily applied to wheeled vehicles to provide an endless track type tread.

An object of the present invention is the provision of a new and improved traction attachment for wheeled vehicles, which attachment has an endless tread member riding over spaced wheels to that one reach of the tread member rests on the ground an another reach thereof is adapted to provide a bight in which a vehicle wheel is supported.

Another object of the invention is the provision of a new and improved endless tread attachment for wheeled vehicles, which attachment may be operatively associated with vehicle wheels by rolling the wheels along a ramp and into a bight in the endless tread member of the attachment.

A further object of the invention is the provision of a new and improved endless tread attachment for vehicles arranged to support a vehicle wheel in a bight in a reach of the endless tread member thereof, and having a ramp structure which may be temporarily associated with the attachment to enable a vehicle wheel to be rolled into and out of the tread bight.

Other objects and advantages of the invention will be apparent from the following detailed description of a preferred form of the invention, references being made to the accompanying drawings, wherein:

Fig. 4 is a sectional view taken on line 4—4 of Fig. 3;

Fig. 5 is a sectional view taken on line 5—5 of Fig. 3;

Fig. 6 is a fragmentary, elevational view showing a bracket for securing the tread attachment to the rear bumper of the automobile;

Fig. 7 is a side elevational view of the structure shown in Fig. 6; and

Fig. 8 is a view taken substantially along line 8—8 of Fig. 3, certain parts being shown broken away;

The invention contemplates an endless tread attachment for wheel vehicles, which attachment comprises a frame having two load bearing wheels mounted thereon over which an endless belt or chain type of tread is adapted to ride so that one reach of the belt tread provides ground traction and another reach thereof has a bight which is adapted to receive a vehicle wheel so that weight of the vehicle is supported by the bight in the tread belt. When the tread attachment is associated with the driving wheel of a vehicle, the weight of the vehicle serves to establish a frictional driving connection between the periphery of the wheel and the tread belt. The bight in the tread not only provides an extensive area of driving contact between the tread and wheel but it also positions the wheel with respect to the attachment.

The tread attachment is such that a ramp structure can be readily placed and removed from a position in which the vehicle wheel can be rolled on the ramp and into or out of the tread belt bight. The ramp structure has parts which cooperate with the tread attachment to hold the attachment and ramp in proper relationship during the time the vehicle wheel is rolled onto and off the attachment.

In one form of the invention two endless tread devices are attached to a frame in spaced parallel relation for application to the driving wheels of a vehicle, such as the rear wheels of an automobile, and the frame has a structure by which it may be attached to a part of the automobile, such as the bumper.

Figure 2:
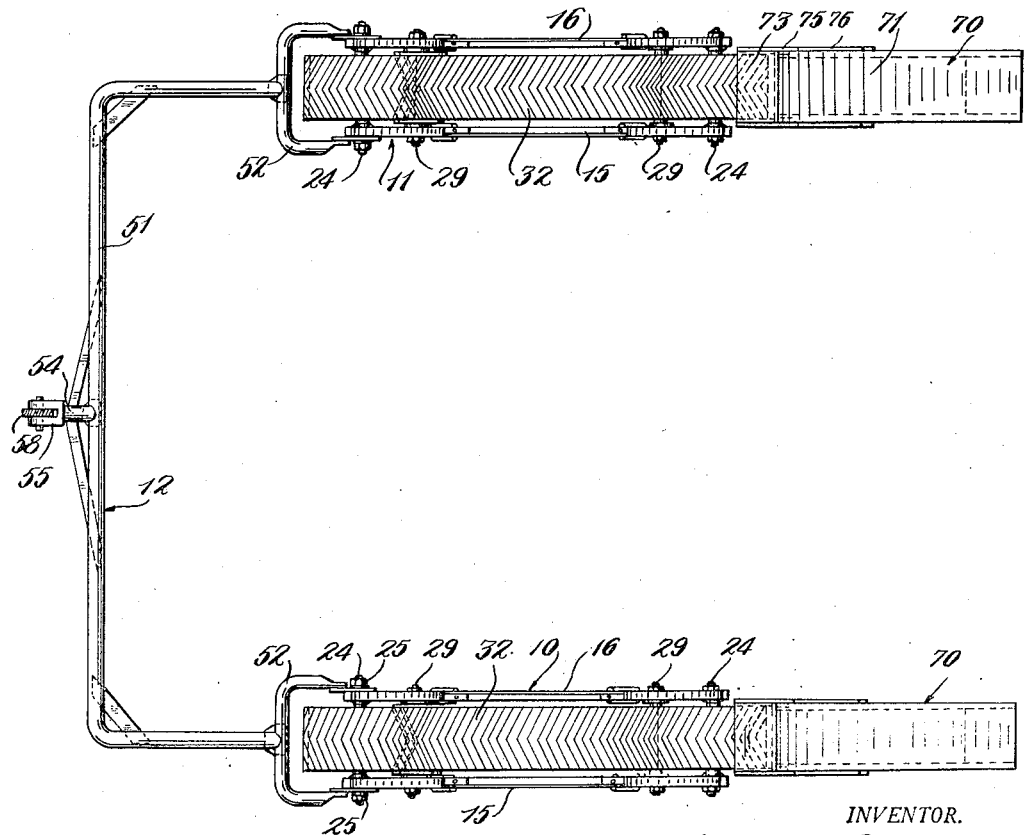
Fig. 2 is a plan view taken substantially along line 2—2 of Fig. 1.

Although the invention may be embodied in various forms and adapted for use in connection with many different types of wheeled vehicles, for the purpose of illustrating the invention I have shown an endless tread attachment for use with automobiles for greatly increasing the traction of the automobile, particularly in soft ground. Referring to Fig. 2 of the drawing, two traction devices 10, 11 are shown interconnected by a yoke type frame 12, which frame maintains the traction devices in spaced parallel relation so that they may be applied to the two rear wheels of a rear wheel drive automobile A. The two devices 10, 11 are identical in construction and like parts thereof are described and referred to by the same reference numerals.

The traction devices 10 and 11 each comprises two identical frame members 15, 16 which are preferably formed of a relatively light rigid metal construction and are arranged in spaced, parallel relation. Two load bearing wheels 17, 18 are journaled between the frames 15 and 16 and at opposite ends thereof. The wheels 17, 18 are of like construction and, as may be seen in Fig. 4, they are each formed of two circular metal discs 19, 20, the peripheries of which are attached, as by welding, to a relatively wide rim 21. The discs 19, 20 have central openings, which are axially aligned, and in which suitable bearings 22 are secured, as by welding. Preferably, the bearings 22 are reinforced by webs 23 interconnecting the sides of discs 19, 20 and the bearings as shown. The wheels are journaled on axles 24, the end portions of which are slightly reduced in diameter relative to the intermediate portion and extend through openings in the end sections of the frames 15 and 16 and are held in place by nuts 25 threaded on the outer ends of the axles. Preferably, washers 26, 27 are located on opposite sides of the frame members 15, 16.

The axles 24 tend to maintain the frame members 15, 16 in rigid spaced relation, but I prefer to provide additional bracing rods 29 which may be connected to the frames similarly to the axles 24 and which have nuts 30 threaded on the ends thereof for securing them to the frames. Washers similar to 26, 27 may be used on the rods 29 at opposite sides of the frames for reinforcement, if desired.

Figure 3:
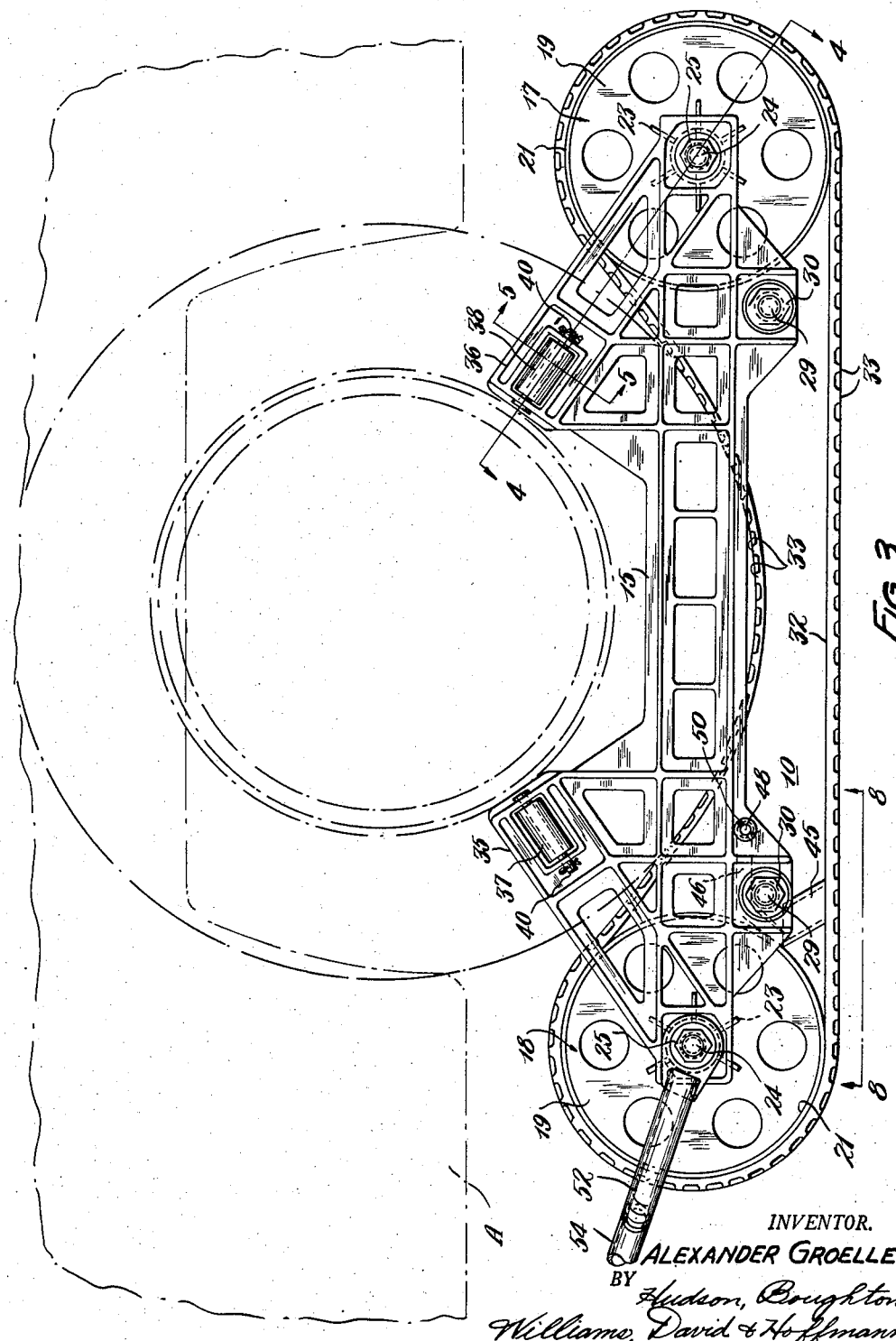
Fig. 3 is a fragmentary, side elevation view similar to that of Fig. 1 but on a larger scale, showing the endless traction tread attachment associated with a wheel of an automobile.

A suitable endless tread belt 32 rides on the wheels 17, 18 and the length of the belt is such that the lower reach lies flat on the ground while the upper reach has a bight therein which extends toward but short of the lower reach, as may best be seen in Fig. 3. It is to be understood that any suitable type of endless tread member could be used instead of the belt shown. Preferably, the endless tread belt has ribs on the outer surface which form a gripping tread, such as that indicated at 33, to provide maximum traction between the belt and the ground.

Figure 1:
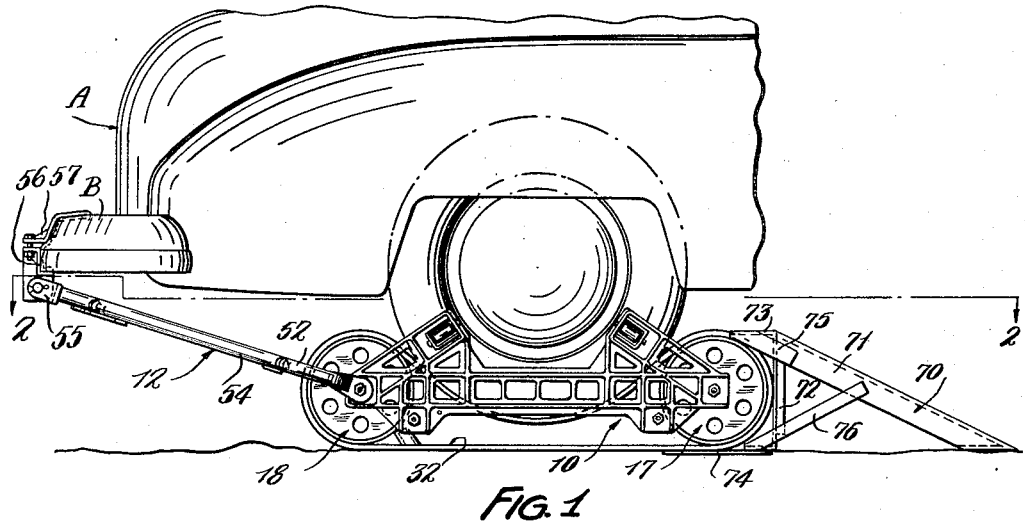
Fig. 1 is a side elevational view of an endless traction tread attachment operatively associated with a passeenger automobile wheel and showing a ramp in position for moving the automobile into or out of association with the attachment.

As may be seen in Figs. 1 and 3, the vehicle wheel is adapted to rest in and to be supported by the bight in the tread belt, and to maintain the wheel on the tread, the frame members 15, 16 each has two upwardly extending structures 35, 36 which support guide rollers 37, 38 adjacent opposite ends of the bight. The rollers 37, 38 are journaled in openings in the frame structures on pins 40 which are supported by the frame. The axes of the rollers 37, 38 lie in planes which extend substantially radially of the vehicle wheel resting in the bight and the rollers are adapted to be engaged by the sides of the tire of the wheel should the wheel tend to become misaligned with the tread.

Preferably, means is provided for scraping dirt and other foreign matter from the upper side of the lower reach of the tread belt 32 immediately forwardly of the rear wheel 18, and in the embodiment shown, this means comprises a V-shaped bar 45 which extends transversely of the tread belt and adjacent to the wheel 18. The bar 45 is supported at opposite ends on two arms 46, 47 which are attached at one end to pivot rod 48 supported at its ends in openings through the frames 15, 16. The rod 48 is shown secured to the frame by cotter pins 50 extending through openings in the outer ends of the rod. The arms 46, 47 rest on the top of the rod 29 to support the member 45 slightly above the top surface of the tread belt 32. It will be apparent that as the attachment wheels roll on the tread belt, the member 45 will deflect any objects which might lodge on the upper surface of the belt to one side or the other and prevent material from entering between the wheel 18 and the tread belt.

In the form of the invention shown, the frames 10 and 11 are adapted to be attached to the automobile by the yoke type frame 12. The frame 12 comprises a U-shaped pipe or rod 51 having forked members 52 attached to the ends thereof, the outer ends of which members have bushings 53, only one of which appears in the drawings, which bushings receive the end portions of axles 24 for the rear wheels 18 and are attached to the axles by the nuts 25. The axles for the rear wheels 18 are slightly longer than the front wheel axles to accommodate the bushings 53. The central portion of the rod 51 has a stem 54 having a clevis 55 at the outer end which is adapted to be connected to a bumper clamp comprising two members 56, 57. The member 56 has a lug 58 to which the clevis 55 is attached by a pin 59 extending through openings through the clevis and lug, the pin being secured in place by a cotter pin 60. The bumper clamp members 56 and 57 have hook-shaped sections 61, 62 which are adapted to engage the bottom and top edges, respectively, of the rear bumper B of the automobile and the clamp members are drawn toward one another to tightly grip the bumper by bolts 63 which extend through openings in flanges 64, 65 formed on the respective clamp members and, preferably, reinforced by webs 68, 69. By the arrangement just described the traction attachment can be secured connected in operative relation with the vehicle wheels by attaching the clamp members 56, 57 to the automobile bumper.

The endless tread attachment may be quickly and easily applied to the automobile by driving the latter's wheels onto the upper reaches of the tread belts 32 by the use of suitable ramp structures and attaching the frame 12 to the rear bumper B by the clamp members 56, 57. The attachment is just as readily disassociated from the automobile by disconnecting frame 12 from the bumper and driving the wheels off of the tread belts by the ramps. In the embodiment of the invention shown, ramps 70 are provided, which ramp structures each preferably comprises an inverted channel-shaped member 71 supported inclined to the ground by an upright member 72, which may be formed of a substantially U-shaped steel bar having laterally projecting upper and lower sections 73, 74. The upper section 73 is substantially tangential with the upper part of wheel 17 and it is reinforced at each side by bars 75 welded to the sides of the member 71 and the outer portion of the section. The lower section 74 is adapted to receive wheel 17 thereon and is reinforced by a pair of bars 76 which are attached at one end to the outer portion of the section and to the intermediate portion of the member 71. The lower section 74 may be of the same stock as bar 72 or it may include a member welded to the bar, as shown.

It will be apparent that the ramps can be operatively associated with the tread devices merely by rolling the wheels 17 and the corresponding portions of the traction belts 32 onto the ramp sections 74 so that the wheels abut the uprights 72, after which the automobile can be easily driven onto or off of the tread belt 32 by way of the ramp. The weight of wheel 17 on the portion 74 maintains the ramp in proper association with the endless tread devices as the automobile is driven on the ramp. The ramps are, of course, removed when the tread attachment is in use.

It will be seen that the weight of the rear of the automobile is supported entirely by the tread belts 32 so that good frictional drives are established between the automobile wheels and belts. Furthermore, the bight in the treads provides substantial contact areas between the belts and automobile wheels, and the belt surfaces engaged by the wheels have the tread formation which further enhances the driving engagement.

To drive the car forwardly by the traction attachment, the driving wheels are driven reversed from normal. Usually the reverse gear of an automobile is of low ratio and therefore maximum driving power is provided for the forward movement of the automobile. To reverse the direction of automobile movement, the rear wheels are driven in the normally forward direction.

I have shown the invention comprising two traction devices arranged to be applied to the driving wheels of an automobile, but it is to be understood that the invention could be embodied in various forms of attachments for increasing traction or merely providing additional support area for different forms of wheeled vehicles. For example, a suitable form of the invention could be adapted for use with a wheel barrow to prevent the wheel from sinking into soft ground. Regardless of its form, an outstanding advantage of my new traction attachment is the ease with which it can be associated and disassociated with vehicle wheels.

Although I have described but one form of the invention, it is to be understood that other forms, modifications and adaptations could be adopted without departing from the scope of the appended claims.

Having thus described my invention, I claim:

1. A tread attachment for vehicles, said attachment comprising a frame having spaced wheels aligned to form a guide for an endless tread member, and an endless tread member supported by and extending between said wheels, the length of said endless tread member being such as to form a bight in one reach thereof, said bight extending toward but short of the other reach and adapted to receive a vehicle wheel therein.

2. A tread attachment for vehicles, said attachment comprising a frame having spaced wheels aligned to form a guide for an endless tread member, and an endless tread member supported by and extending between said wheels and having upper and lower reaches, the length of said endless tread member being such as to form a bight in the upper reach thereof, said bight extending toward but short of the lower reach and adapted to receive a vehicle wheel therein.

3. A tread attachment for vehicles, said attachment comprising a frame having spaced wheels aligned to form a guide for an endless tread member, an endless tread member supported by and extending between said wheels, the length of said endless tread member being such as to form a bight in one reach of said tread member, said bight extending toward but short of the other reach and adapted to receive a vehicle wheel therein, and guide devices supported at opposite sides of said frame and adapted to engage the sides of the vehicle wheel in said bight to maintain said vehicle wheel on said tread member.

4. A tread attachment for vehicles, said attachment comprising a frame having spaced wheels aligned to form a guide for an endless tread member, an endless tread member supported by and extending between said wheels, the length of said endless tread member being such as to form a bight in one reach of said tread member, said bight extending toward but short of the other reach and adapted to receive a vehicle wheel therein, said frame having portions projecting above said bight and in vertical planes at the sides of said tread member, and rollers supported by said frame portions and adapted to be engaged by a vehicle wheel in said bight tending to move out of alignment with the tread member forming the bight.

5. A tread attachment for vehicles, said attachment comprising a frame having spaced wheels aligned to form a guide for an endless tread member, an endless tread member supported by and extending between said wheels and forming a reach for supporting a vehicle wheel, and a ramp structure having a vehicle wheel runway surface substantially tangential to one of said wheels, said ramp structure having a projecting portion adapted to extend under one of said wheels and the adjacent portion of said tread member to stabilize said ramp structure in a loading position adjacent one end of said attachment.

6. A tread attachment for vehicles, said attachment comprising two frames each having spaced wheels aligned to form a guide for an endless tread member, an endless tread member supported by and extending between said wheels, the length of said endless tread member being such as to form a bight in one reach of said tread member, said bight extending toward but short of the other reach and adapted to receive a vehicle wheel therein, a frame structure interconnecting said two frames and adapted to maintain said frames spaced from one another to correspond to the wheel tread of a vehicle, and means for detachably securing said frame structure to the vehicle.

ALEXANDER GROELLER.

REFERENCES CITED

The following references are of record in the file of this patent:

UNITED STATES PATENTS

| Number | Name | Date |
| --- | --- | --- |
| 1,251,344 | Damman | Dec. 25, 1917 |
| 1,558,432 | Wilson | Oct. 20, 1925 |
| 1,638,329 | Fennel | Aug. 9, 1927 |
| 1,774,835 | Lombard | Sept. 2, 1930 |

FOREIGN PATENTS

| Number | Country | Date |
| --- | --- | --- |
| 474,582 | Germany | Mar. 21, 1929 |